United States Patent
Bakken

(10) Patent No.: US 10,359,918 B2
(45) Date of Patent: Jul. 23, 2019

(54) SYSTEM AND METHOD FOR PREVENTING UNINTENDED USER INTERFACE INPUT

(71) Applicant: SPOTIFY AB, Stockholm (SE)

(72) Inventor: Isak Bakken, Stockholm (SE)

(73) Assignee: SPOTIFY AB, Stockholm (SE)

( * ) Notice: Subject to any disclaimer, the term of this patent is extended or adjusted under 35 U.S.C. 154(b) by 549 days.

(21) Appl. No.: 14/986,322

(22) Filed: Dec. 31, 2015

(65) Prior Publication Data

US 2017/0192649 A1    Jul. 6, 2017

(51) Int. Cl.
  *G06F 3/048* (2013.01)
  *G06F 3/0484* (2013.01)
  *G06F 3/0488* (2013.01)
  *G06F 8/38* (2018.01)
  *G06F 3/0481* (2013.01)
  *G06F 9/451* (2018.01)

(52) U.S. Cl.
  CPC ........ *G06F 3/04842* (2013.01); *G06F 3/0488* (2013.01); *G06F 3/04812* (2013.01); *G06F 8/38* (2013.01); *G06F 9/451* (2018.02)

(58) Field of Classification Search
  CPC .......................... G06F 3/0481; G06F 3/04842
  See application file for complete search history.

(56) References Cited

U.S. PATENT DOCUMENTS

2015/0301683 A1* 10/2015 Yuan ................. H04M 1/72522
                                                              345/178

* cited by examiner

*Primary Examiner* — Matthew Ell
(74) *Attorney, Agent, or Firm* — Tucker Ellis LLP

(57) ABSTRACT

The present disclosure relates to a method performed by a processing device comprising a Graphical User Interface (GUI). The method comprises detecting a selection event at a position in the GUI, as input via the GUI. The method also comprises deciding that the detected selection event relates to a first graphical control element in the GUI which was present in said position at a point of time a predetermined time period before the detection of the selection event. The method also comprises executing an action associated with the first graphical control element.

20 Claims, 2 Drawing Sheets

SYSTEM AND METHOD FOR PREVENTING UNINTENDED USER INTERFACE INPUT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to a method performed by a processing device such as a smartphone, tablet computer or laptop computer, comprising a Graphical User Interface (GUI) comprising detecting a selection event such as a click event in the GUI.

BACKGROUND

A GUI is an interface which allows a user to interact with a device by means of graphical elements, as compared with older text-based interfaces in which a user typed commands. Some graphical elements, herein called graphical control elements or widgets, are selectable and associated with an action to be performed if selected. Such selection is typically done by clicking on the element (in case of a touchscreen, the click may be called tap).

In modern GUIs there are typically lots of different graphical elements arranged in a predetermined order but loaded separately. This implies that when the GUI is updated, graphical elements may unexpectedly change position in the GUI as another graphical element is loaded and presented in the GUI. This may surprise a user which is about to click on a certain graphical control element but instead misses said graphical control element and possibly unintentionally clicks another graphical control element whereby the device performs an action which was not intended by the user.

This problem is illustrated in FIG. 1, which shows a touchscreen GUI of a device at three different sequential points in time (denoted a-c). In (a) a user of the device wants to select an info button for getting more information about something. However, as he/she is just about to tap the info button, the GUI updates at (b) and a picture advertising the sale of an item (for example a car) is inserted above the info button, leading to the info button moving and the user by mistake clicking a button relating to the advertisement. In (c), the user has, as a consequence of clicking the wrong button, purchased the item instead of getting the information he/she really wanted.

SUMMARY

It is an objective of the present invention to prevent unintended GUI input by a user due to updating of the GUI.

According to an aspect or embodiment of the present invention, there is provided a method performed by a processing device, e.g. a smartphone, tablet computer or laptop computer, comprising a GUI. The method comprises detecting a selection event at a position in the GUI, as input via the GUI. The method also comprises deciding that the detected selection event relates to a first graphical control element, e.g. a widget such as button or clickable icon or picture, in the GUI which was present in said position at a point of time a predetermined time period before the detection of the selection event. The method also comprises executing an action associated with the first graphical control element.

According to another aspect or embodiment of the present invention, there is provided a computer program product comprising computer-executable components for causing a processing device to perform an embodiment of the method of the present disclosure when the computer-executable components are run on processor circuitry comprised in the processing device.

Embodiments of the method may conveniently be performed by/in a processing device as discussed in the present disclosure, e.g. a smartphone, tablet computer or laptop computer.

According to another aspect or embodiment of the present invention, there is provided a processing device comprising a GUI, processor circuitry, and storage storing instructions executable by said processor circuitry whereby said processing device is operative to detect a selection event at a position in the GUI, as input via the GUI. The processing device is also operative to decide that the detected selection event relates to a first graphical control element in the GUI which was present in said position at a point of time a predetermined time period before the detection of the selection event. The processing device is also operative to execute an action associated with the first graphical control element.

According to another aspect or embodiment of the present invention, there is provided a computer program comprising computer program code which is able to, when run on processor circuitry of a processing device comprising a GUI, cause the processing device to detect a selection event at a position in the GUI, as input via the GUI. The code is also able to cause the processing device to decide that the detected selection event relates to a first graphical control element in the GUI which was present in said position at a point of time a predetermined time period before the detection of the selection event. The code is also able to cause the processing device to execute an action associated with the first graphical control element.

It is an advantage to decide that the detected selection event relates to a first graphical control element in the GUI which was present in said position at a point of time a predetermined time period before the detection of the selection event in view of any updates of the GUI occurring shortly before the detection of the selection event. Thus, a user of the processing device may, e.g. by means of a finger or stylus (in case of a touchscreen GUI) or by means of a pointing device such as a mouse or joystick, reduce the risk of unintentionally selecting (e.g. clicking on) a graphical control element which appears or moves just before the selection. The predetermined time period may thus compensate for the reaction time of the user.

It is also an advantage that embodiments of the invention may be realised by means of software implementation, without any hardware adjustments necessary.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
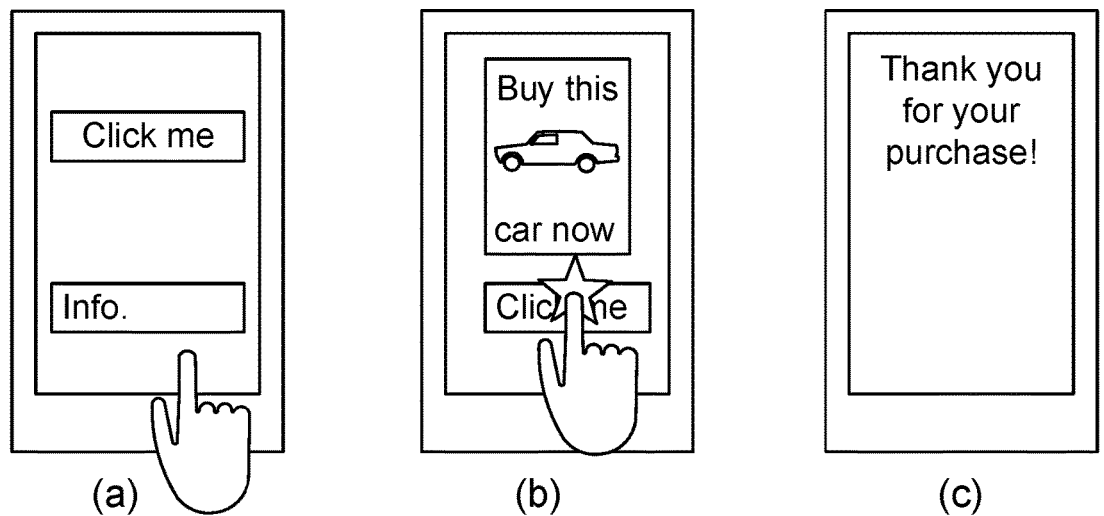
FIG. 1 illustrates an embodiment of a touchscreen device in time sequence in accordance with prior art.
Figure 2:
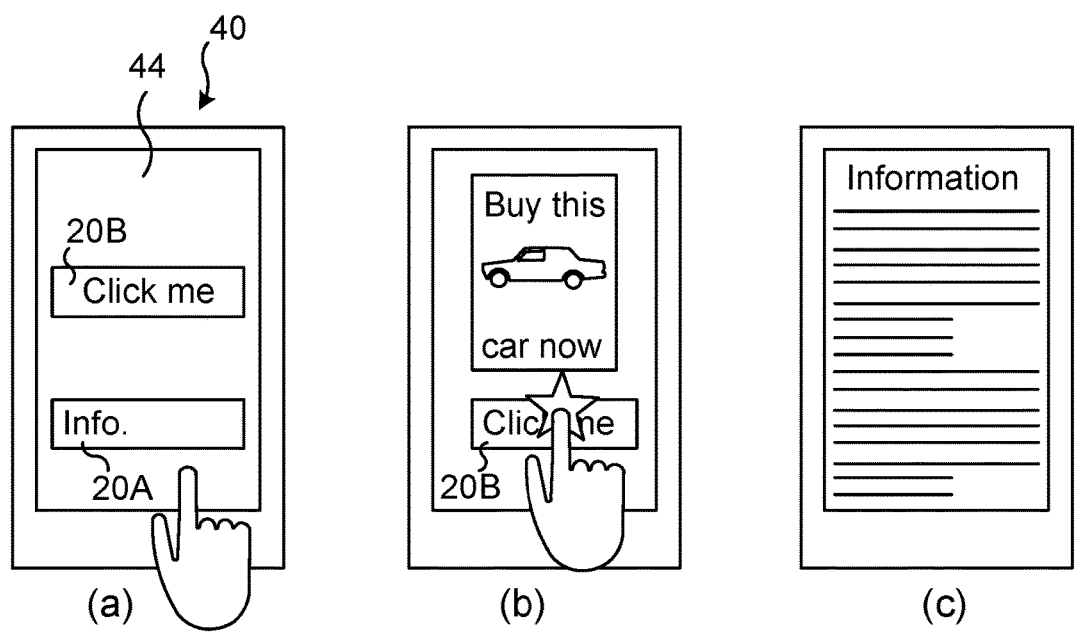
FIG. 2 illustrates an embodiment of a touchscreen device in time sequence in accordance with embodiments of the present invention.

FIG. 2 illustrates a similar situation as FIG. 1, but with use of embodiments of the present invention, and shows a touchscreen GUI 44 of a processing device 40 at three different sequential points in time (denoted a-c). In (a) a user of the processing device 40 wants to select a first graphical control element 20a in the form of an info button for getting more information about something. However, as he/she is just about to tap the info button, the GUI updates at (b) and a picture advertising the sale of an item (for example a car) is inserted above the info button 20a, leading to the info button moving and the user by mistake clicking a second graphical control element 20b in the form of a button relating to the advertisement. In accordance with embodiments of the present invention, the processing device realises that, since the GUI update was within a predetermined time period before the user clicked on the touchscreen, the user intended to tap (thereby selecting) the info button 20a, not the advertisement button 20b. Thus, in (c), the processing device performs the action associated with the info button 20a, in this case the action being to open a new web page, and presents the user desired information on the GUI 44.

Figure 3:
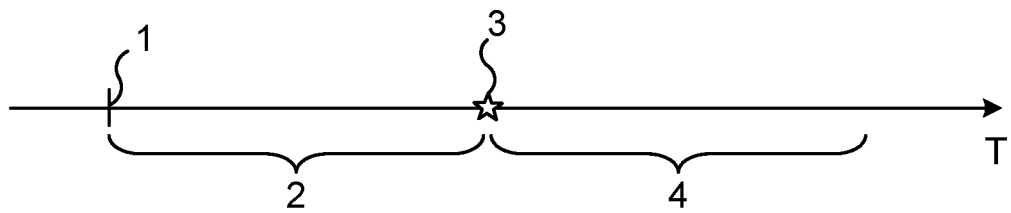
FIG. 3 is a time line illustrating an embodiment of the predetermined time period in accordance with embodiments of the present invention.

FIG. 3 illustrates a time line of embodiments of the inventive method. A selection event 3, e.g. a click (e.g. tap or touch event in case of a touchscreen GUI 44), is detected. In response thereto, the processing device 40 reviews one or more data recorded over a period of time, including at a time point 1, to check which (if any) graphical control element 20a was in the position of the click at that time point 1. The time period 2 between the selection event 3 and the time point 1 is predetermined and is conveniently chosen in view of a typical human reaction time. The time period 2 may e.g. be less than 500 milliseconds (ms), less than 300 ms or, preferably, less than 200 ms, and, optionally, more than 100 ms or more than 150 ms, since a typical human reaction time is between 150 and 200 ms. After the selection event 3 has been detected, the processing device 40 performs the action 4 associated with the graphical control element 20a.

Figure 4:
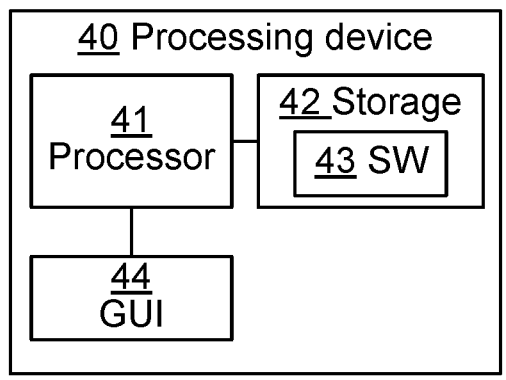
FIG. 4 is a schematic block diagram of an embodiment of the processing device of embodiments of the present invention.

FIG. 4 schematically illustrates an embodiment of a processing device 40 of the present disclosure. The processing device 40 comprises processor circuitry 41 e.g. a central processing unit (CPU). The processor circuitry 41 may comprise one or a plurality of processing units in the form of microprocessor(s). However, other suitable devices with computing capabilities could be comprised in the processor circuitry 41, e.g. an application specific integrated circuit (ASIC), a field programmable gate array (FPGA) or a complex programmable logic device (CPLD). The processor circuitry 41 is configured to run one or several computer program(s) or software (SW) 43 stored in a storage 42 of one or several storage unit(s) e.g. a memory. The SW 43 may e.g. comprise computer programs for an operating system (OS), a web browser and/or service application(s), app(s), of the processing device. The storage unit is regarded as a computer readable means which may, together with computer-executable components of the SW 43 stored thereon, form a computer program product as discussed herein and may e.g. be in the form of a Random Access Memory (RAM), a Flash memory or other solid state memory, or a hard disk, or be a combination thereof. The processor circuitry 41 may also be configured to store data in the storage 42, as needed. The processing device 40 also comprises a GUI 44 as discussed herein. If the processing device is a wireless (radio) device, it may typically also comprise a radio interface (not shown) for connection to/via e.g. the Internet.

According to another aspect or embodiment of the present invention, there is provided a processing device 40 comprising a GUI 44, processor circuitry 41, and storage 42 storing instructions 43 executable by said processor circuitry whereby said processing device is operative to detect a selection event 3 at a position in the GUI, as input via the GUI. The processing device is also operative to decide that the detected selection event 3 relates to a first graphical control element 20a in the GUI 44 which was present in said position at a point of time 1 a predetermined time period 2 before the detection of the selection event 3. The processing device is also operative to execute an action 4 associated with the first graphical control element 20a.

According to another aspect or embodiment of the present invention, there is provided a computer program 43 comprising computer program code which is able to, when run on processor circuitry 41 of a processing device 40 comprising a GUI 44, cause the processing device to detect a selection event 3 at a position in the GUI, as input via the GUI. The code is also able to cause the processing device to decide that the detected selection event 3 relates to a first graphical control element 20a in the GUI 44 which was present in said position at a point of time 1 a predetermined time period 2 before the detection of the selection event 3. The code is also able to cause the processing device to execute an action 4 associated with the first graphical control element 20a.

Figure 5:
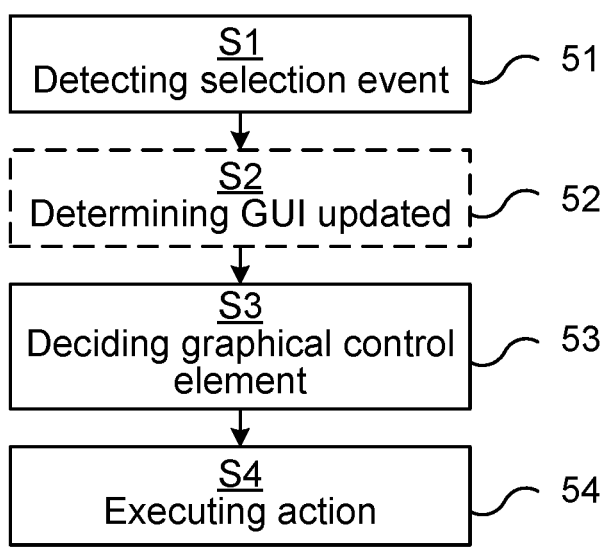
FIG. 5 is a schematic flow chart of embodiments of the method of embodiments of the present invention.

FIG. 5 is a schematic flow chart illustrating embodiments of the method of the present invention. The method is performed by/in a processing device 40, as discussed herein, comprising a GUI 44.

The processing device detects S1 (51) a selection event 3 at a position in the GUI 44, as input via the GUI. The selection may e.g. be done by a user by means of pointing and clicking on the position with a pointing device, e.g. a mouse or joystick, or, if the GUI is comprised in a touchscreen, by touching/tapping on the position with a finger or stylus.

In response to the detection S1, the processing device 40 decides S3 that the detected S1 selection event 3 relates to a first graphical control element 20a in the GUI 44 which was present in said position at a point of time 1 a predetermined time period 2 before the detection of the selection event.

Optionally, before the deciding S3, the processing device 40 may have determined S2 (52) that the GUI 44 was updated within the predetermined time period 2. The processing device 40 may thus be allowed to only perform the deciding S3 (53) in case the GUI has been updated within the time period 2, thus saving processing resources.

Then, after the deciding S3, the processing device 40 executes S4 (54) an action 4 associated with the first graphical control element 20a. Examples of the action 4 may include any of opening a web page, window, menu etc., or sending information such as an order, request or the like to a web server.

In some embodiments, the method comprises determining that the first graphical control element 20a was not present in said position at the time of the detection of the selection event 3. This may inform the processing device 40 that it should not consider the selection event 3 at the time it was made, but rather at the point of time 1 the predetermined time period 2 before the detection. In some embodiments, the method comprises determining that a second graphical control element 20b was present in said position at the time of the detection of the selection event 3. This may inform the processing device 40 that to consider the selection event 3 at the time it was made may result in an incorrect action 4 being executed S4.

In some embodiments, the GUI 44 is comprised in a touchscreen and the selection event 3 corresponds to a tap (touch) on the touchscreen at the GUI position, typically by means of a finger or stylus of the user of the processing device 40.

Alternatively, in some embodiments, the selection event 3 corresponds to a click by means of a pointing device such as a mouse or joystick at the GUI position.

The method may be performed by means of any SW 43 in the processing device 40, e.g. for a service application (app) or web browser. However, it may be preferred that the method is implemented by an OS in the processing device, thus allowing the method to be used generally in the processing device, for any app or browser. Otherwise, if the method is only used sometimes, e.g. for a certain app, this may be confusing for the user.

According to an aspect or embodiment of the present invention, there is provided a computer program product 42 comprising computer-executable components 43 for causing a processing device 40 to perform an embodiment of the method of the present disclosure when the computer-executable components are run on processor circuitry 41 comprised in the processing device.

Embodiments of the present invention may be conveniently implemented in a processing device 40 using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) 42 having instructions 43 stored thereon/in which can be used to program a computer to perform any of the methods/processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The present disclosure has mainly been described above with reference to a few embodiments. However, as is readily appreciated by a person skilled in the art, other embodiments than the ones disclosed above are equally possible within the scope of the present disclosure, as defined by the appended claims.

What is claimed is:

1. A method performed by a processing device comprising a graphical user interface (GUI), the method comprising:

displaying, at the GUI, a plurality of graphical control elements, wherein each graphical control element is displayable at a respective display position within the GUI and is associated with a respective action upon selection of the graphical control element, and wherein display of one or more graphical control elements changes over a period of time as the GUI is updated;

recording, over the period of time as the GUI is updated, a data indicative of positions of the one or more graphical control elements being displayed within the GUI;

in response to receiving an input at the GUI, detected as a selection event at a selection position within the GUI:

determining if the GUI including its display of graphical control elements was updated within a predetermined time period preceding the selection event; and in response to determining that the GUI was updated within the predetermined time period preceding the selection event:

determining, by reference to the data recorded over the period of time as the GUI is updated, and indicative of positions of the one or more graphical control elements being displayed within the GUI, that the detected selection event is associated with a first graphical control element of the plurality of graphical control elements that was displayed, at the selection position, at a point of time the predetermined time period before the detection of the selection event, instead of being associated with a second graphical control element displayed at the selection position when the selection event is detected; and executing the respective action associated with the first graphical control element.

2. The method of claim 1, wherein the determining that the GUI was updated comprises determining that the first graphical control element was not displayed at the selection position at the time of the detection of the selection event.

3. The method of claim 2, wherein the determining that the GUI was updated comprises determining that the second graphical control element was displayed at the selection position at the time of the detection of the selection event.

4. The method of claim 1, wherein the GUI is comprised in a touchscreen and wherein the selection event corresponds to a tap on the touchscreen.

5. The method of claim 1, wherein the selection event corresponds to a click by means of a pointing device.

6. The method of claim 1, wherein the predetermined time period is less than 200 ms.

7. The method of claim 1, wherein the method is performed by an operating system of the processing device.

8. The method of claim 1, wherein executing the respective action associated with the first graphical control element comprises one or more of opening a web page, window, or menu, or sending information to a web server.

9. The method of claim 1, wherein determining that the GUI was updated within the predetermined time period is based on one or more data recorded during the predetermined time period.

10. The method of claim 1, wherein the respective action associated with the first graphical control element is executed instead of the respective action associated with the second graphical control element.

11. The method of claim 1, wherein the predetermined time period is more than 100 ms.

12. The method of claim 1, wherein the method is performed by one or more of a service application or a web browser provided at the processing device.

13. The method of claim 1, wherein the plurality of graphical control elements are arranged within the display in a predetermined order, and loaded within the display separately.

14. The method of claim 1, wherein the detected selection event is determined to be associated with the first graphical control element of the plurality of graphical control elements only upon determining that the GUI was updated within the predetermined time period preceding the selection event.

15. A non-transitory computer readable storage medium, including instructions stored thereon, which when read and executed by one or more processors, cause a processing device comprising a graphical user interface (GUI) to perform a method comprising:
displaying, at the GUI, a plurality of graphical control elements, wherein each graphical control element is displayable at a respective display position within the GUI and associated with a respective action upon selection of the graphical control element, and wherein display of one or more graphical control elements changes over a period of time as the GUI is updated;
recording, over the period of time as the GUI is updated, a data indicative of positions of the one or more graphical control elements being displayed within the GUI;
in response to receiving an input at the GUI, detected as a selection event at a selection position within the GUI:
determining if the GUI including its display of graphical control elements was updated within a predetermined time period preceding the selection event; and
in response to determining that the GUI was updated within the predetermined time period preceding the selection event:
determining, by reference to the data recorded over the period of time as the GUI is updated, and indicative of positions of the one or more graphical control elements being displayed within the GUI, that the detected selection event is
associated with a first graphical control element of the plurality of graphical control elements that was displayed, at the selection position, at a point of time the predetermined time period before the detection of the selection event, instead of being associated with a second graphical control element displayed at the selection position when the selection event is detected; and
executing the respective action associated with the first graphical control element.

16. The non-transitory computer readable storage medium of claim 15, wherein the plurality of graphical control elements are arranged within the display in a predetermined order, and loaded within the display separately.

17. The non-transitory computer readable storage medium of claim 15, wherein the detected selection event is determined to be associated with the first graphical control element of the plurality of graphical control elements only upon determining that the GUI was updated within the predetermined time period preceding the selection event.

18. A processing device comprising:
a graphical user interface (GUI);
processor circuitry; and
storage storing instructions executable by said processor circuitry whereby said processing device is operative to:
display, at the GUI, a plurality of graphical control elements, wherein each graphical control element is displayable at a respective display position within the GUI and is associated with a respective action upon selection of the graphical control element, and wherein display of one or more graphical control elements changes over a period of time as the GUI is updated;
record, over the period of time as the GUI is updated, a data indicative of positions of the one or more graphical control elements being displayed within the GUI;
in response to receiving an input at the GUI, detected as a selection event at a selection position within the GUI:
determine if the GUI including its display of graphical control elements was updated within a predetermined time period preceding the selection event; and
in response to determining that the GUI was updated within the predetermined time period preceding the selection event:
determine, by reference to the data recorded over the period of time as the GUI is updated, and indicative of positions of the one or more graphical control elements being displayed within the GUI, that the detected selection event is
associated with a first graphical control element of the plurality of graphical control elements that was displayed, at the selection position, at a point of time the predetermined time period before the detection of the selection event, instead of being associated with a second graphical control element displayed at the selection position when the selection event is detected; and
execute the respective action associated with the first graphical control element.

19. The processing device of claim 18, wherein the plurality of graphical control elements are arranged within the display in a predetermined order, and loaded within the display separately.

20. The processing device of claim 18, wherein the processing device is operable to determine that the detected selection event is associated with the first graphical control element of the plurality of graphical control elements only upon determining that the GUI was updated within the predetermined time period preceding the selection event.

* * * * *